(12) United States Patent
Whitney et al.

(10) Patent No.: US 10,526,992 B2
(45) Date of Patent: Jan. 7, 2020

(54) METHOD AND SYSTEM TO DETECT AND MITIGATE SENSOR DEGRADATION

(71) Applicant: GM Global Technology Operations LLC, Detroit, MI (US)

(72) Inventors: Christopher E. Whitney, Commerce, MI (US); Kevin C. Wong, Canton, MI (US); Marcus S. Gilbert, Grass Lake, MI (US); Jeffrey M. Hutmacher, Fowlerville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 112 days.

(21) Appl. No.: 15/479,855

(22) Filed: Apr. 5, 2017

(65) Prior Publication Data

US 2018/0291832 A1  Oct. 11, 2018

(51) Int. Cl.
*F02D 41/22* (2006.01)
*G06N 20/00* (2019.01)
*G07C 5/08* (2006.01)

(52) U.S. Cl.
CPC ........... *F02D 41/222* (2013.01); *G06N 20/00* (2019.01); *G07C 5/0808* (2013.01)

(58) Field of Classification Search
CPC .............. F02D 41/222; F02D 41/1495; F02D 41/1454; F02D 41/1456; G06N 99/005; G07C 5/0808; F01N 11/007; F02B 77/086

See application file for complete search history.

(56) References Cited

U.S. PATENT DOCUMENTS

| | | | | |
|---|---|---|---|---|
| 6,804,600 | B1 * | 10/2004 | Uluyol | G05B 9/02 123/479 |
| 7,614,384 | B2 * | 11/2009 | Livshiz | F02D 11/105 123/399 |
| 8,275,193 | B2 * | 9/2012 | Lin | G06K 9/3216 382/103 |
| 8,473,179 | B2 * | 6/2013 | Whitney | F02D 13/0207 701/102 |
| 8,700,550 | B1 * | 4/2014 | Bickford | G06N 99/005 700/286 |
| 8,712,929 | B1 * | 4/2014 | Bickford | G06N 99/005 700/286 |
| 2004/0084024 | A1 * | 5/2004 | Malaczynski | F02D 35/021 123/435 |
| 2009/0254240 | A1 * | 10/2009 | Olsen, III | G06Q 10/06 701/29.5 |
| 2012/0290879 | A1 * | 11/2012 | Shibuya | G05B 23/021 714/26 |

(Continued)

*Primary Examiner* — Hung Q Nguyen
*Assistant Examiner* — Brian P Monahon

(57) ABSTRACT

A method to detect and mitigate sensor degradation in an automobile system includes: collecting output signal data from at least one of a sensor and an actuator which is outputting the signal data related to operational parameters of a vehicle system; placing the sensor or the actuator in communication with a fault box used to purposely corrupt the output signal data; analyzing patterns of the output signal data compared to signal data from a nominal operating sensor or actuator using an artificial intelligence program; identifying when a statistical range of the patterns exceeds a first threshold level; and modifying a control signal to change the operational parameters of the vehicle system.

11 Claims, 2 Drawing Sheets

(56) References Cited

U.S. PATENT DOCUMENTS

2015/0266489 A1* 9/2015 Solyom ............... B60W 50/029
  701/23
2015/0361859 A1* 12/2015 Youssef ................. F01N 11/00
  701/34.4

* cited by examiner

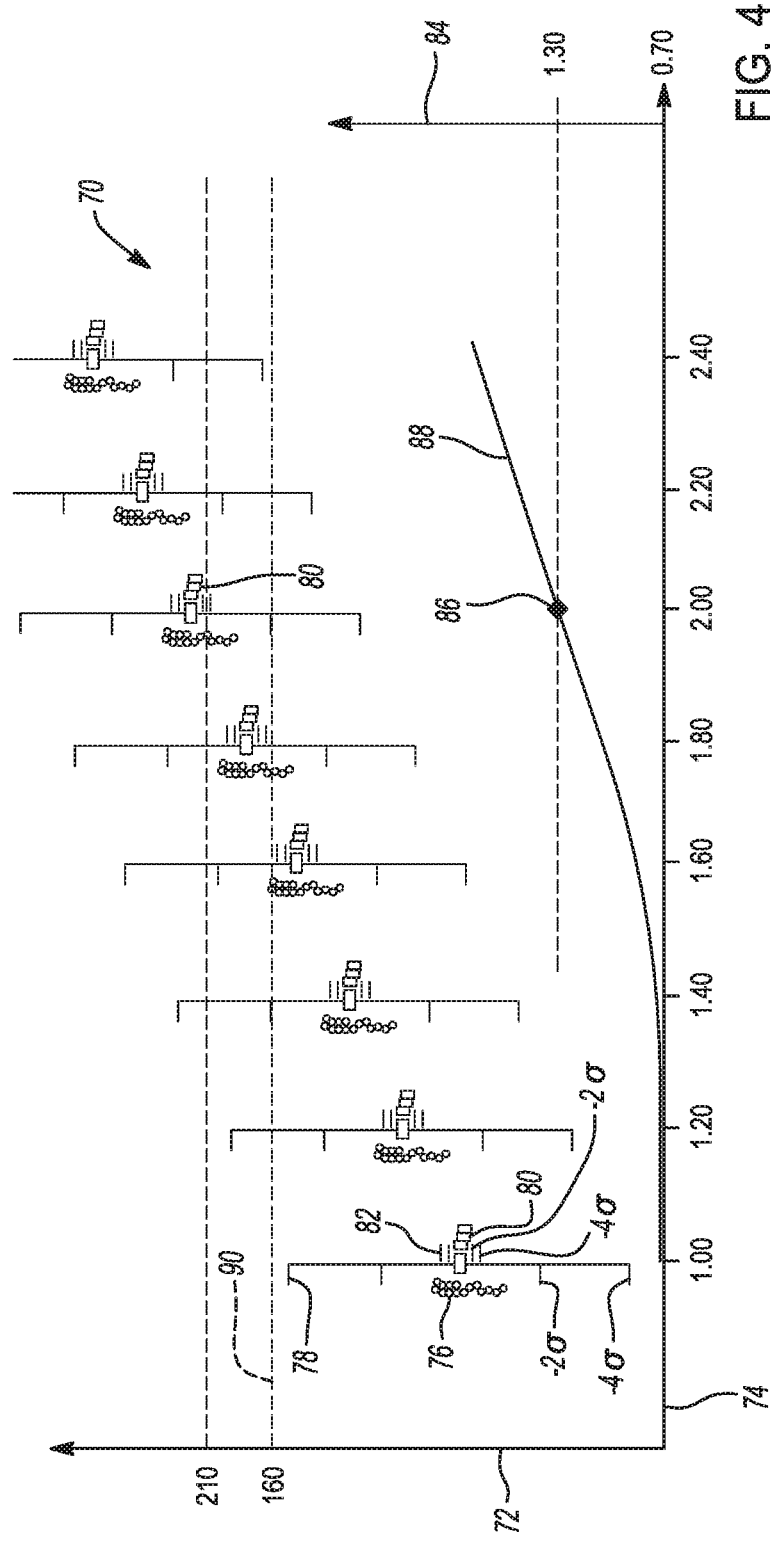
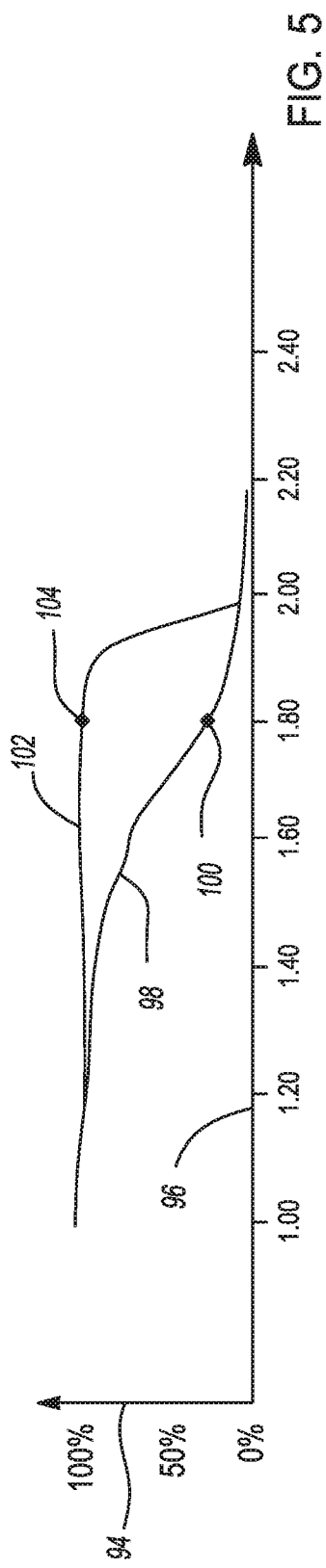

METHOD AND SYSTEM TO DETECT AND MITIGATE SENSOR DEGRADATION

The present disclosure relates to automobile vehicle sensors and in particular oxygen sensors used in exhaust gas systems.

Automobile systems use multiple different types of sensors and actuators. Sensor types include pressure, temperature, position, acceleration, chemical constituent, mass flow, voltage, and current and the like. Actuator types include fuel injector, throttle blade, turbo wastegate, CAM phasers, spark plug, fuel pump, exhaust gas recirculation, active fuel management, variable lift cam, alternator and electrical current, and variable geometry turbo and the like. Sensors and actuators are originally set for optimum or normal operating conditions, but can "degrade" and eventually fail. As used herein, the term "sensor" is also applicable to actuator.

Using as an example an oxygen sensor, in automotive applications with gasoline engines there are tight emissions constraints on diesel and gasoline engines. Gasoline engines perform better in emissions because they use a catalytic converter which converts approximately 99% of the engine out emissions to environmentally friendly constituents at the tail pipe. It is important to maintain engine out emissions with average emissions constituents that are at stoichiometry. It is known to use oxygen sensors to determine whether the exhaust emissions are lean or rich of stoichiometry. If either lean or rich, an engine controller then applies closed loop fuel control to change the fuel control to drive the system the opposite way. For example if the oxygen sensor indicates the system is lean, the fuel control system adjusts the system to be rich.

One failure is known as a lean to rich slowness, in which the fuel control system directs a change from rich to lean with the expectation that the oxygen sensor will indicate the change in a predefined time and shape. When the sensor is degraded or failing, however, the time for the change to be indicated takes longer than anticipated (longer than at original system optimal level), and the control system therefore reacts to the time delay as if the sensor is operating properly and both over-compensates and under-compensates in response. The control system is tuned based on a nominal or expected performance of the oxygen sensor. When the oxygen sensor degrades from nominal the emissions performance of the system can degrade. Sensor signals can be fed to a fault indicator which indicates with a sensor illumination signal that a problem is occurring, however, this system provides substantially no margin for sensors which are degrading, but which have not yet failed.

The above noted sensors and actuators have similar degradation and failure modes. Thus, while current automotive sensors and actuators achieve their intended purpose, there is a need for a new and improved system and method for determining sensor and actuator fault and to mitigate degradation.

SUMMARY

According to several aspects, a method to detect and mitigate sensor degradation in an automobile system includes: collecting output signal data from at least one device which is outputting the signal data related to operational parameters of a vehicle system; analyzing patterns of the output signal data compared to signal data from a nominal operating device; identifying when the patterns exceed a threshold level indicating the at least one device is operating in a degraded condition; and modifying a control signal to change the operational parameters of the vehicle system.

In an additional aspect of the present disclosure, the method includes analyzing patterns of the output signal data using an artificial intelligence program.

In another aspect of the present disclosure, the method includes introducing corrupted data into the at least one device.

In another aspect of the present disclosure, the method includes collecting the corrupted data and the output signal data from at least one device in an artificial intelligence fault predictor.

In another aspect of the present disclosure, the method includes identifying a range of deviation of the corrupted data from the output signal data.

In another aspect of the present disclosure, the method includes generating changes to a system control signal using an artificial intelligence compensation module and applying the changes to maintain signal control of the at least one device.

In another aspect of the present disclosure, the method includes placing the at least one device in communication with a fault box used to purposely corrupt the output signal data.

In another aspect of the present disclosure, the method includes changing at least one setting in the fault box to simulate a degrading at least device.

In another aspect of the present disclosure, the at least one device defines one of: a sensor used to determine pressure, temperature, position, acceleration, chemical constituent, mass flow, voltage, or current; and an actuator used for one of a fuel injector, a throttle blade, a turbo wastegate, a CAM phaser, a spark plug, a fuel pump, an exhaust gas recirculation device, an active fuel management device, a variable lift cam, an alternator current, an electrical current, and a variable geometry turbo.

In another aspect of the present disclosure, the method includes identifying when the patterns exceed a second threshold level indicating the at least one device is operating in a failed condition; and outputting a device failed signal.

According to several aspects, a method to detect and mitigate sensor degradation in an automobile system includes: collecting output signal data from at least one of a sensor and an actuator which is outputting the signal data related to operational parameters of a vehicle system; placing the sensor or the actuator in communication with a fault box used to purposely corrupt the output signal data; analyzing patterns of the output signal data compared to signal data from a nominal operating sensor or actuator using an artificial intelligence program; identifying when a statistical range of the patterns exceeds a first threshold level; and modifying a control signal to change the operational parameters of the vehicle system.

In another aspect of the present disclosure, the method includes identifying multiple output signal data sets from the sensor or the actuator output signal data relating output signal data at each of different fault box settings.

In another aspect of the present disclosure, the method includes: comparing a first output signal data set from the sensor or the actuator having a first +−4 sigma ($\sigma$) range to the output signal data set analyzed using the artificial intelligence pattern recognition program defining a second output signal data set having a +−4 sigma range which is narrower than the first output signal data set; and setting a failure threshold.

In another aspect of the present disclosure, the method includes: generating a probability of sensor or actuator diagnostic pass for each of the different fault box settings; and creating a probability of sensor or actuator diagnostic pass curve.

In another aspect of the present disclosure, the method includes reducing variation range in the output signal data.

In another aspect of the present disclosure, the method includes combining the output signal data from the at least one of the sensor and the actuator with output signal data from at least one other sensor or actuator prior to the analyzing step.

In another aspect of the present disclosure, the method includes communicating the output from the artificial intelligence fault predictor to a fault box settings module having predefined and saved conditional data for each of the sensor and the actuator used as the first threshold to generate a device faulted signal as a second threshold to generate a device failed signal.

According to several aspects, a system to detect and mitigate sensor degradation in an automobile system includes an output signal data set collected from at least one of a sensor and an actuator which is outputting the signal data related to operational parameters of a vehicle system. A fault box receives the output signal data set and acts to purposely corrupt the output signal data set. An artificial intelligence program analyzes patterns of the output signal data set compared to an output signal data set from a nominal operating sensor or actuator. A first threshold level is applied to an output from the artificial intelligence program. A control signal is generated when the first threshold level is exceeded operating to change the operational parameters of the vehicle system.

In another aspect of the present disclosure, an artificial intelligence compensation module generates changes to the control signal and applies the changes to maintain signal control of the at least one of the sensor and the actuator.

In another aspect of the present disclosure, an artificial intelligence fault predictor operating to collect operational data and corrupted data output from the at least one of the sensor and the actuator and to compare the operational data and corrupted data output to optimum sensor output data and to identify a range of deviation of the at least one of the sensor and the actuator from the optimum output data.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 4 is a graph depicting output signal data sets from an exhaust AFR sensor relating lean-to-rich times versus various fault box settings with and without the use of the artificial intelligence pattern recognition program of the present disclosure; and FIG. 5 is a graph depicting a probability of sensor diagnostic pass at each of the fault box settings of FIG. 4 with and without the use of the artificial intelligence pattern recognition program of the present disclosure.

DETAILED DESCRIPTION

The following description is merely exemplary in nature and is not intended to limit the present disclosure, application, or uses.

Figure 1:
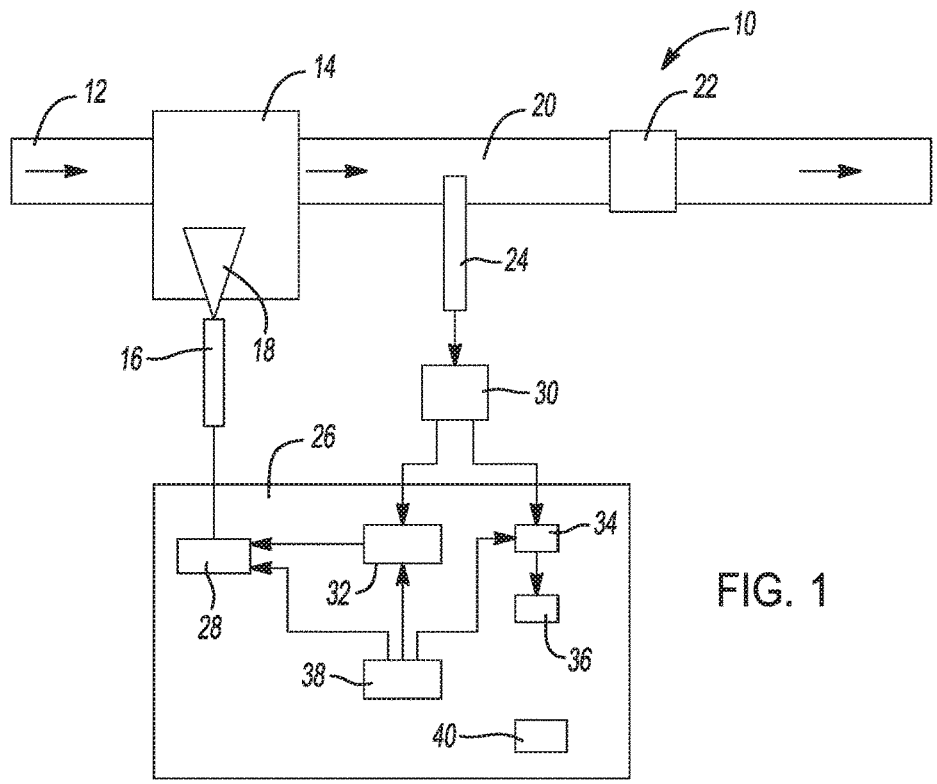
FIG. 1 is a flowchart of a system and method to detect and mitigate sensor degradation applied to an exhaust gas sensor according to an exemplary embodiment.

Referring to FIG. 1, a system and method to detect and mitigate sensor degradation 10 is depicted for use in developing a control system for an exemplary exhaust air fuel ratio (AFR) or vehicle sensor for an automobile. The system and method to detect and mitigate sensor degradation 10 applied to a sensor includes an ambient air intake 12 which feeds ambient air into a mixing and combustion chamber 14. A fuel injector 16 injects fuel as a spray pattern 18 into the mixing and combustion chamber 14 where a fuel and air mixture is ignited. Burned exhaust gas 20 is exhausted from the mixing and combustion chamber 14 typically through a catalytic converter 22 as is known.

An exhaust AFR sensor 24 is positioned in the flow stream of the burned exhaust gas 20. It is important that the engine out emissions as the burned exhaust gas 20 have average emissions constituents that are at stoichiometry. The exhaust AFR sensor 24 is used to determine whether the exhaust emissions are lean or rich of stoichiometry. For example if the output from the exhaust AFR sensor 24 indicates the system is lean, an engine control unit (ECU) 26 adjusts the system by changing fuel flow via the fuel injector 16 to be rich. The engine control unit (ECU) 26 applies a closed loop fuel control system to change the fuel control to drive the system the opposite way indicated by the exhaust AFR sensor 24 output. The engine control unit (ECU) 26 includes a fuel control module 28 in communication with the fuel injector 16 which directs fuel flow through the fuel injector 16. The exhaust AFR sensor 24 is in communication with a sensor fault box 30 which is initially used to train the system by purposely corrupting the output signals from the AFR sensor 24. The corrupted signals are then compared to sensor operation at nominal operating parameters using an artificial intelligence program saved in a random access memory (RAM) device. The sensor fault box 30 communicates with each of an artificial intelligence compensation module 32 and an artificial intelligence fault predictor 34.

The artificial intelligence compensation module 32 generates changes to the control signals directed to the fuel control module 28 that maintain signal control of the AFR sensor 24 even as the corrupted signal changes are made by the sensor fault box 30. Signals generated by the artificial intelligence compensation module 32 therefore permit continued operation of the AFR sensor 24 in what would presently be considered to be a faulted state or condition, which therefore expands the operable range of operation and life of the AFR sensor 24. When testing oxygen or other sensors for diagnostic development and to control system robustness to them, the sensor fault box 30 can also be changed or tuned to simulate degrading sensors. Actuators are similarly evaluated.

The artificial intelligence fault predictor 34 collects operational data and corrupted data output from the exhaust AFR sensor 24. This data is compared to optimum sensor output data to identify a range of deviation of the exhaust AFR sensor 24 from the optimum output data.

The output from the artificial intelligence fault predictor 34 is communicated to a fault box settings module 36. The fault box settings module 36 provides predefined and saved conditional data for each sensor and actuator that is used as a threshold or trigger to generate a "sensor faulted" or an actuator failed signal. For example, a level above which data from the exhaust AFR sensor 24 is considered faulted or failed is saved in a memory or lookup table and compared to the signal output from the artificial intelligence fault predictor 34 and when the sensor output is above the faulted or failed level, a sensor faulted signal is generated. The sensor faulted signal can be communicated to a control module which illuminates for example a check engine light.

The ECU 26 also includes an input module 38 which collects sensor and actuator output data from the other sensors and actuators of the vehicle, and coordinates which of this data is relevant in conjunction with the target sensor or actuator output data such as from the exhaust AFR sensor 24. Such data may for the example of the exhaust AFR sensor 24 include air temperature, air pressure, humidity, and the like. The ECU 26 coordinates the relevant data from the input module 38 for input to the fuel control module 28. The ECU 26 also coordinates the relevant data from the input module 38 for input to the artificial intelligence compensation module 32 allowing all relevant data to be used in conjunction with the artificial intelligence program to calculate changes to the control signals directed to the fuel control module 28 that maintain signal control of the AFR sensor 24.

For the example of the exhaust AFR sensor 24, an artificial intelligence pattern recognition program 40 is applied to the sensor output from the exhaust AFR sensor 24 to classify the patterns that are seen as the sensor control system ECU 26 creates fuel control changes in response to levels of oxygen sensor performance. The "patterns" that are evaluated by the artificial intelligence pattern recognition program 40 include but are not limited to output signal frequency, output signal amplitude, output signal geometry, and the like. For example if the output signal amplitude decreases or increases over time compared to the nominal sensor output signal amplitude saved in a memory or RAM, the artificial intelligence pattern recognition program 40 identifies first that a change has occurred which exceeds a predetermined threshold, indicating signal degradation, and then identifies how the change itself has altered over time, which provides an ongoing recognition of the degradation of the output signal amplitude up until a predetermined second threshold is reached indicating a sensor or actuator failure has occurred.

The first and the second predetermined threshold data is applied which identifies when to classify the observed patterns as a sensor fault or as sensor degradation. In the above example for the oxygen or exhaust AFR sensor 24, changes in levels of sensor performance are compared to predicted or known sensor output patterns of a nominal or new exhaust AFR sensor to predict when the exhaust AFR sensor 24 is degrading or failed. The artificial intelligence pattern recognition program 40 can also be used to predict sensor performance based on emissions degradation over time and how the sensor fault box setting characterizes the performance. If the observed patterns from the sensor output exceed a predetermined threshold the sensor will be considered "faulted" and a system warning will be illuminated such as the check engine light.

The artificial intelligence pattern recognition program 40 functions as follows. A sensor or actuator output signal is received and a pattern of the signal is identified. The pattern of the signal is compared to a pattern of a signal from a nominal or new sensor or actuator of the same type which is saved in a memory or a lookup table. Differences between the patterns of the received output signal and the saved output signal which are within a predetermined statistical range which are further determined to be within a degraded but acceptable range are applied in a system controller to change system control parameters as necessary to allow the sensor or actuator to continue operation. Differences between the patterns of the received output signal and the saved output signal which fall outside of the predetermined statistical range defining the degraded range indicate a sensor or actuator failure, which trigger a sensor or actuator failure signal. As noted herein, signals from multiple other sensors and actuators can also be included in the analyses such that other sensor or actuator signals can be combined to enhance the sensor or actuator allowable operating range.

Referring to FIG. 2 and again to FIG. 1, a graph 42 represents an air flow ratio 44 on a y-axis versus time (e.g., seconds) on an x-axis. A first curve 48 represents the sensor output signal over time which may include sensor degradation. A second curve 50 represents an air flow ratio target defining a new or optimum sensor output. After the artificial intelligence pattern recognition program 40 is applied to the sensor output from the exhaust AFR sensor 24 to classify the patterns that are identified, the sensor control system ECU 26 creates or modifies fuel control changes in response to levels of the sensor performance to change the air flow ratio to more closely match the target or second curve 50. A third curve 52 represents the resulting system air flow ratio after operational changes are made to the fuel injector 16 based on actual output signal data from the exhaust AFR sensor 24 modified using the artificial intelligence pattern recognition program 40. As is evident, the air flow ratio represented by the third curve 52 closely resembles the target values of the second curve 50.

Figure 2:
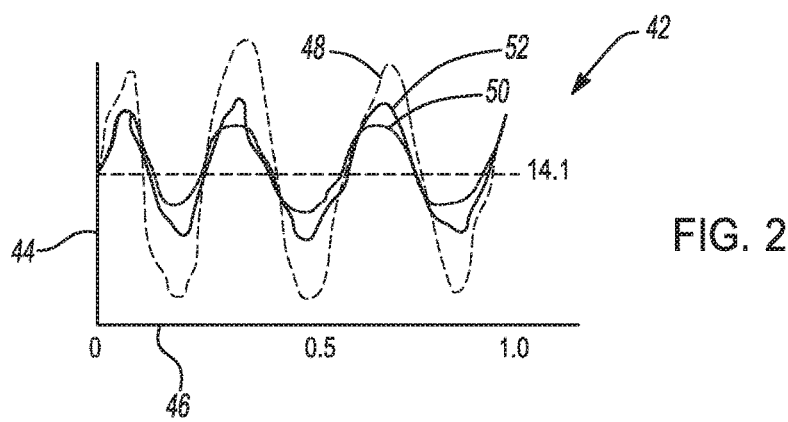
FIG. 2 is a graph depicting target, uncorrected and corrected air flow ratios versus time according to an exemplary embodiment.

Referring to FIG. 3 and again to FIG. 2, a graph 54 identifies a percentage of the allowable exhaust emissions standard 56 over time 58. An output curve 60 presents an output signal of the exhaust AFR sensor 24 without use of the artificial intelligence pattern recognition program 40 of the present disclosure, which identifies the output curve 60 exceeds a maximum allowable emissions level of 130% where a line 62 intersects the output curve 60 at a point 64. When it is recognized that a performance change in the exhaust AFR sensor 24 output is occurring using the pattern recognition of the artificial intelligence pattern recognition program 40, the fuel control system ECU 26 orders a change. The fuel control module 28 directs a change in the output of the fuel injector 16 until a second output signal from the exhaust AFR sensor 24 represented by a modified output curve 66 does not exceed a line 68 representing an emissions level of 100%. Control of the fuel injector 16 allows system operation meeting the 100% emissions standard to continue even with a degraded condition of the exhaust AFR sensor 24.

Figure 3:
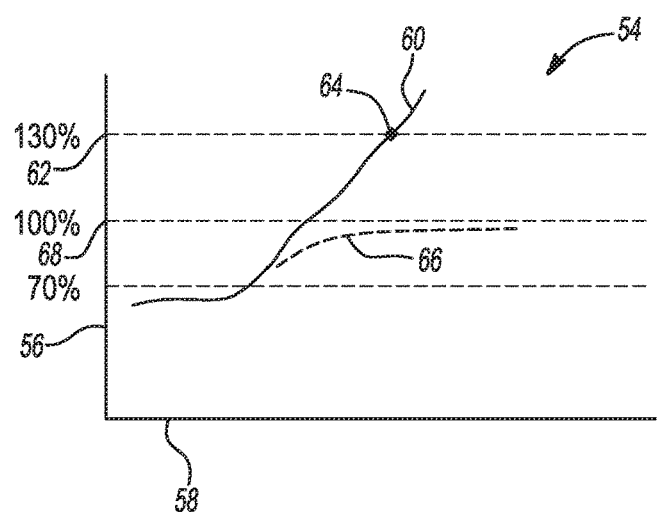
FIG. 3 is a graph depicting percentages of an allowable exhaust emissions standard over time with and without the use of the artificial intelligence pattern recognition program of the present disclosure.

Referring to FIG. 4 and again to FIGS. 1 through 3, a graph 70 presents multiple output signal data sets from the exhaust AFR sensor 24 relating lean-to-rich times 72 versus different fault box settings 74. An unmodified output signal data set 76 from the exhaust AFR sensor 24 has a +−4 sigma ($\sigma$) range 78. When the output data is analyzed using the artificial intelligence pattern recognition program 40 a modified output signal data set 80 from the exhaust AFR sensor 24 has a +−4 sigma range 82 which is narrower than the output signal data set 76. When the output signal data sets applying multiple different fault box settings including 1.00, 1.20, 1.40, 1.60, 1.80, 2.00, 2.20, and 2.40 are analyzed, the exhaust AFR sensor 24 data indicates at a fault box setting of 2.00 the emissions reach the maximum allowable 1.3× emissions standard 84 provided by a vertical axis to the right in FIG. 4, identified by a point 86 on an emissions curve 88. In order to be confident within the +−2 sigma range that a fault setting will set at the fault box setting of 2.00, a failure threshold is set at 160 ms indicated by a 160 ms time line 90 at the −2σ threshold.

Referring to FIG. 5 and again to FIG. 4, a graph 92 presents a probability of sensor diagnostic pass 94 at each of the various fault box settings of FIG. 4. A probability of sensor diagnostic pass curve 98 indicates that without the use of the artificial intelligence pattern recognition program 40 at the fault box setting of 1.80, which is below the 1.30× emission standard reached at the fault box setting of 2.00, the probability of sensor diagnostic pass indicated at a point 100 is approximately 25%, therefore the probability of sensor diagnostic failure is approximately 75%.

With continuing reference to FIGS. 4 and 5, by reprocessing the same data from the exhaust AFR sensor 24 using the artificial intelligence pattern recognition program 40 the variation +−4σ range at each fault box setting is reduced. Each modified output signal data set 80 for the various fault box settings from the exhaust AFR sensor 24 is presented having the reduced variation +−4σ range 82. Using the reduced variation +−4σ range 82 for each sensor output fault box setting, the sensor fail threshold moves from 160 ms up to 210 ms at the same 1.30× emission standard and fault box setting of 2.00 at the −2σ threshold.

A modified probability of sensor diagnostic pass curve 102 is shifted to the right and has a steeper transition slope compared to the probability of sensor diagnostic pass curve 98. At the same 1.80 fault box setting, there is approximately a 99.99% probability of sensor diagnostic passage indicated at a point 104 on the modified probability of sensor diagnostic pass curve 102. The artificial intelligence pattern recognition program 40 applied to the same sensor output data and at the same fault box settings therefore reduces the quantity of predicted sensor diagnostic failures by reducing variation range in the sensor data.

Output from the artificial intelligence pattern recognition program 40 can also be used as a predictive tool. As previously noted herein, the output from the artificial intelligence fault predictor 34 is communicated to the fault box settings module 36 which provides predefined and saved conditional data for each sensor and actuator that is used as a threshold or trigger to generate the "sensor faulted" or the actuator failed signal. Data represented in known sensor and actuator degradation curves, available for example from suppliers of each sensor or actuator, is saved in various lookup tables for access by the artificial intelligence fault predictor 34. The data in the degradation curves identifies a range of sensor and actuator operational outputs from new or nominal through failure.

When a sensor or actuator reaches a predetermined percentage of the sensor or actuator faulted condition, an anticipated failure point is generated. For example, the predetermined percentage of the sensor or actuator faulted condition will be reached at a measurable vehicle operating condition, such as for example at a present total mileage value or distance driven since initiation of the sensor or actuator. Given the present total mileage value and the value of the predetermined percentage of the sensor or actuator faulted condition, the anticipated failure point can be predicted to occur at a future total mileage value, which is generated and saved in memory.

If for example the predetermined percentage of the sensor or actuator faulted condition is 75% and the present total mileage value is 75,000 miles, if degradation is substantially linear the anticipated failure point may for example be projected at a future total mileage value of 100,000 miles. This data can be accessed for example by a vehicle maintenance facility for use in determining when the sensor or actuator should be replaced, and the appropriate sensor or actuator can be ordered ahead of the next vehicle maintenance availability. The determination of the anticipated failure point can also incorporate known degradation rates. For example the data in the degradation curves can indicate linear or non-linear degradation rates, which can be applied to predict the anticipated failure point.

The method to detect and mitigate sensor degradation of the present disclosure offers several advantages. The use of pattern recognition provided by the artificial intelligence pattern recognition program 40 can be applied to sensor and actuator output data patterns. By reviewing patterns of data output from various sensors and actuators, improvements can be made in data recognition and sensor and actuator operation, failure mode prediction, lifetime operation and the like. These include application to sensors used to determine pressure, temperature, position, acceleration, chemical constituent, mass flow, voltage, and current and the like. The method to detect and mitigate sensor degradation of the present disclosure can similarly be applied to actuators used in automobile vehicles, including actuators used for the fuel injector, throttle blade, turbo wastegate, CAM phasers, spark plug, fuel pump, exhaust gas recirculation, active fuel management, variable lift cam, alternator and electrical current, and variable geometry turbo and the like.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method to detect and mitigate sensor degradation in an automobile system, comprising:
   collecting an output signal data from at least one device which is outputting the signal data related to operational parameters of a vehicle system;
   analyzing patterns of the output signal data compared to signal data from a nominal operating device;
   identifying when the patterns exceed a threshold level indicating the at least one device is operating in a degraded condition;
   introducing corrupted data into the at least one device;
   identifying a range of deviation of the corrupted data from the output signal data;
   modifying a control signal to change the operational parameters of the vehicle system;
   identifying when the patterns exceed a second threshold level indicating the at least one device is operating in a failed condition, and outputting a device failed signal; and
   generating an anticipated failure point when the at least one device reaches a predetermined percentage of the at least one device failed signal at a measurable vehicle operating condition defining a present vehicle total mileage value.

2. The method to detect and mitigate sensor degradation in an automobile system of claim 1, further including analyzing patterns of the output signal data using an artificial intelligence program.

3. The method to detect and mitigate sensor degradation in an automobile system of claim 2, further including collecting the corrupted data and the output signal data from the at least one device in an artificial intelligence fault predictor.

4. The method to detect and mitigate sensor degradation in an automobile system of claim 1, further including generating changes to a system control signal using an artificial intelligence compensation module and applying the changes to maintain signal control of the at least one device.

5. The method to detect and mitigate sensor degradation in an automobile system of claim 1, further including placing the at least one device in communication with a fault box used to purposely corrupt the output signal data.

6. The method to detect and mitigate sensor degradation in an automobile system of claim 5, further including changing at least one setting in the fault box to simulate a degrading at least one device.

7. The method to detect and mitigate sensor degradation in an automobile system of claim 1, wherein the at least one device defines one of:
a sensor used to determine pressure, temperature, position, acceleration, chemical constituent, mass flow, voltage, or current; and
an actuator used for one of a fuel injector, a throttle blade, a turbo wastegate, a CAM phaser, a spark plug, a fuel pump, an exhaust gas recirculation device, an active fuel management device, a variable lift cam, an alternator current, an electrical current, and a variable geometry turbo.

8. A method to detect and mitigate sensor degradation in an automobile system, comprising:
collecting an output signal data from at least one of a sensor and an actuator which is outputting the output signal data related to operational parameters of a vehicle system in an artificial intelligence fault predictor;
placing the sensor or the actuator in communication with a fault box used to purposely corrupt the output signal data and introduce corrupted data into the output signal data of the at least one sensor and the actuator;
analyzing patterns of the corrupted output signal data compared to a nominal signal data from a nominal operating sensor or actuator using an artificial intelligence program;
identifying when a statistical range of deviation of the corrupted data from the output signal data exceeds a first threshold level; and
modifying a control signal to change the operational parameters of the vehicle system;
identifying multiple output signal data sets from the sensor or the actuator output signal data relating output signal data at each of different fault box settings;
generating a probability of sensor or actuator diagnostic pass for each of the different fault box settings; and
creating a probability of sensor or actuator diagnostic pass curve.

9. The method to detect and mitigate sensor degradation in an automobile system of claim 8, further including:
comparing a first output signal data set from the sensor or the actuator having a first +−4 sigma ($\sigma$) range to the output signal data set analyzed using the artificial intelligence pattern recognition program defining a second output signal data set having a +−4 sigma range which is narrower than the first output signal data set; and
setting a failure threshold.

10. The method to detect and mitigate sensor degradation in an automobile system of claim 8, further including reducing variation range in the output signal data.

11. A method to detect and mitigate sensor degradation in an automobile system, comprising:
collecting an output signal data from at least one of a sensor and an actuator which is outputting the output signal data related to operational parameters of a vehicle system in an artificial intelligence fault predictor;
placing the sensor or the actuator in communication with a fault box used to purposely corrupt the output signal data and introduce corrupted data into the output signal data of the at least one sensor and the actuator;
analyzing patterns of the corrupted output signal data compared to a nominal signal data from a nominal operating sensor or actuator using an artificial intelligence program;
identifying when a statistical range of deviation of the corrupted data from the output signal data exceeds a first threshold level; and
modifying a control signal to change the operational parameters of the vehicle system;
communicating the output from the artificial intelligence fault predictor to a fault box settings module having predefined and saved conditional data for each of the sensor and the actuator used as the first threshold to generate a device faulted signal and a second threshold to generate a device failed signal; and
generating an anticipated failure point when the sensor or the actuator reaches a predetermined percentage of the sensor or actuator device failed signal at a measurable vehicle operating condition defining a present vehicle total mileage value.

\* \* \* \* \*